US008040818B2

(12) United States Patent
Maneval et al.

(10) Patent No.: US 8,040,818 B2
(45) Date of Patent: Oct. 18, 2011

(54) METHOD FOR EXCHANGE OF UPKEEP-RELEVANT INFORMATION WITH A COMPUTER-SUPPORTED, UPKEEP SYSTEM

(75) Inventors: Michael Maneval, Schopfheim (DE); Georg Veith, Frick (CH); Eugenio Ferreira Da Silva Neto, Biel-Benken (CH); Klaus Nunnenmacher, Buggingen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 619 days.

(21) Appl. No.: 12/219,414

(22) Filed: Jul. 22, 2008

(65) Prior Publication Data
US 2009/0030950 A1 Jan. 29, 2009

(30) Foreign Application Priority Data
Jul. 23, 2007 (DE) .......................... 10 2007 034 634

(51) Int. Cl.
*H04L 12/26* (2006.01)
(52) U.S. Cl. ..................................... 370/252; 455/414.1
(58) Field of Classification Search .................. 370/352, 370/252; 455/428, 414, 415, 419, 41; 340/539, 340/5.31
See application file for complete search history.

(56) References Cited

U.S. PATENT DOCUMENTS

| | | | |
|---|---|---|---|
| 6,965,806 B2 | 11/2005 | Eryurek | |
| 7,010,294 B1 | 3/2006 | Pyotsia | |
| 7,035,630 B2 * | 4/2006 | Knowles | 455/419 |
| 7,068,164 B1 * | 6/2006 | Duncan et al. | 340/539.16 |
| 7,085,257 B1 * | 8/2006 | Karves et al. | 370/352 |
| 7,386,276 B2 * | 6/2008 | Sama et al. | 455/41.3 |
| 7,460,865 B2 * | 12/2008 | Nixon et al. | 455/428 |
| 2004/0230582 A1 | 11/2004 | Pagnano | |
| 2004/0230661 A1 * | 11/2004 | Rashid et al. | 709/207 |
| 2004/0259533 A1 * | 12/2004 | Nixon et al. | 455/414.1 |
| 2005/0083907 A1 * | 4/2005 | Fishler | 370/352 |
| 2006/0087402 A1 | 4/2006 | Manning | |
| 2006/0285436 A1 * | 12/2006 | Lopez et al. | 367/27 |
| 2007/0208864 A1 * | 9/2007 | Flynn et al. | 709/227 |
| 2008/0150683 A1 * | 6/2008 | Mikan et al. | 340/5.31 |
| 2008/0242945 A1 * | 10/2008 | Gugliotti et al. | 600/300 |
| 2008/0268823 A1 * | 10/2008 | Shalev et al. | 455/415 |

FOREIGN PATENT DOCUMENTS

| | | |
|---|---|---|
| EP | 1 288 757 | 3/2003 |
| WO | WO 2004/055610 | 7/2004 |
| WO | WO 2007/040776 | 4/2007 |

* cited by examiner

*Primary Examiner* — Thong Vu
(74) *Attorney, Agent, or Firm* — Bacon & Thomas, PLLC

(57) ABSTRACT

A method for exchanging upkeep-relevant information regarding a field device with a computer-supported upkeep system, which manages upkeep-relevant information regarding the field device in a database. A mobile, manually portable device is utilized, which has an interface for a wireless Internet access. According to the method, a wireless Internet access is established by the mobile, manually portable device. Subsequently, upkeep-relevant invention regarding the field device is exchanged between the computer-supported, upkeep system, which is connected to the Internet, and the mobile, manually portable device, via the Internet.

11 Claims, 2 Drawing Sheets

METHOD FOR EXCHANGE OF UPKEEP-RELEVANT INFORMATION WITH A COMPUTER-SUPPORTED, UPKEEP SYSTEM

TECHNICAL FIELD

The invention relates to a method utilizing a mobile, hand-carried device for exchange of upkeep-relevant information regarding a field device with a computer-supported, upkeep system, which manages, in a database, upkeep-relevant information regarding the field device.

BACKGROUND DISCUSSION

Often applied in process automation technology are field devices to serve for registering and/or influencing process variables. Thus, sensors, such as, for example, fill-level measuring devices, flow measuring devices, pressure- and temperature-measuring devices, pH-redox potential measuring devices, conductivity measuring devices, register corresponding process variables, fill-level, flow (e.g. flow rate), pressure, temperature, pH-value, and conductivity, respectively, while actuators, such as, for example, valves or pumps, serve for influencing process variables, such as, for example, changing the flow of a liquid in a section of pipeline, or the fill-level in a container.

Referred to as field devices are, in principle, all devices placed near a process for delivering or processing process-relevant information. A large number of such field devices are manufactured and sold by the firm, Endress+Hauser.

In modern industrial plants, field devices are, as a rule, connected via bus systems (Profibus®, Foundation® Fieldbus, etc.) with one or more superordinated units. Instead of a bus system, also, for example, a parallel-wire or an analog signal transmission can be provided between the field devices and the one or more superordinated units. Normally, the superordinated units are control systems, or control units, such as, for example, a PLC (programmable logic controller) or PCS (process control system). The superordinated units serve for, among other purposes, process control, process visualization, process monitoring, as well as for start-up of the field devices.

For minimizing down-time of a plant containing field devices, modern industrial plants frequently employ computer-supported, upkeep systems, which manage, in a database, upkeep-relevant information regarding the field devices and, on occasion, also other devices being used in the plant. These systems are referred to herein as "computer-supported, upkeep systems". These, as a rule, software-based, computer-supported, upkeep systems can, depending on supplier and on configuration of the plant of interest, perform various functions with reference to the management and organization of upkeep work. Especially, these computer-supported, upkeep systems can perform the procedures and functions conventionally manually performed by maintenance personnel or a management person responsible for upkeep of the plant, in order to plan upkeep work to be done and to document performed upkeep work.

A software-based, computer-supported, upkeep system of this type is known under the acronym "CMMS" (computerized maintenance management system). As a rule, at least the following functions are provided by a CMMS, with it being understood that deviations can arise in the case of particular CMMS versions offered by individual suppliers:

Creating and planning upkeep jobs for individual field devices (and, on occasion, other devices of a plant), based on device-specific upkeep intervals and data on already executed upkeep work, as well as, on occasion, additionally based on information concerning available maintenance personnel;

recording and documenting of service reports, malfunction reports, inputs regarding required replacement parts and/or of work orders regarding other upkeep work to be done;

asset management, especially managing and providing of device data, handbooks, check lists, warranty information, upkeep intervals, service contracts, information concerning purchase date, information concerning service life to be expected, replacement part information, information concerning malfunction reports of the field device and for problem handling of the same and/or information concerning parametering, calibration and/or configuration of the individual field devices (and, on occasion, other devices of a plant);

inventory management, especially management of inventory quantities and execution of queries concerning the availability of replacement parts, tools, aids and consumed materials sent to a storage location (for example, a storage location of the plant operator) or to a manufacturer;

statistical analysis, especially providing information regarding frequency of various defects or malfunctions, number of already executed upkeep jobs, maintenance costs, etc., in the case of the different field devices (and, on occasion, in the case of other devices of a plant).

Alternatively to, or in supplementation of, a CMMS, also a "PAM" (plant asset management) can be provided. In a PAM-system, as a rule, various relevant pieces of information and their time sequence are stored for the individual field devices (and, on occasion, for the other devices of a plant). Especially, documented in a PAM are device-specific data, starting from the date of manufacture right up to the current date, such as, for example, information concerning performed upkeep work, exchanged parts, etc. Besides CMMS and PAM, other software-based, computer-supported, upkeep systems exist, these being "manufacturer-specific, computer-supported, upkeep systems", by which upkeep-relevant information of one or more field devices are managed in a database. These other maintenance systems perform, as a rule, at least a part of the functions explained above in reference to CMMS and PAM.

Computer-supported, upkeep systems of such type are frequently employed in a plant-encompassing manner, in order, for example, to manage upkeep-relevant information of field devices and, on occasion, of other devices connected in a plant, for all plants of a plant operator. Frequently, the computer of the data processing installation, in which such a computer-supported, upkeep system is implemented, is arranged spatially separated from the individual field devices (and, on occasion, from further devices of the plant). Maintenance personnel performing upkeep work on-site at a field device, cannot, therefore, directly access information stored in the computer-supported, upkeep system. Additionally, the computer-supported, upkeep system cannot be directly updated by the maintenance personnel.

In order to have the information relevant for the upkeep of a field device available on-site, it has been usual, to this point in time, for the maintenance personnel or a third party to retrieve the presumably required information in advance from the computer-supported, upkeep system. For this, it has been necessary that the pertinent person visit the computer or the data processing installation, where the computer-supported, upkeep system is implemented, or, on occasion, another computer, which can access the computer-supported, upkeep system via a company network, and print out the presumably required information in paper form or transfer such information via an appropriate interface (e.g. USB, Bluetooth or infrared) onto a "PDA" ("Personal Digital Assistant"). To the extent that the computer or the data processing installation, where the computer-supported, upkeep system is implemented, is Internet connected, there is, additionally, the option that such person can download the presumably required information via the Internet in advance via a computer with stationary Internet access (e.g. via a cable modem). The downloaded information could then be saved on the computer, which is, as a rule, at the workplace of the affected person, and additionally printed out in paper form and/or transferred onto a PDA. The printouts in paper form and/or the PDA with the information saved in advance can then be taken with the maintenance personnel to the field device.

It is, however, often not possible to correctly predict in advance exactly that information which will be needed. Therefore, as a rule, more extensive information is obtained than will eventually actually be necessary. Additionally, an added time and management effort is connected with obtaining this more extensive information. Furthermore, the case can arise, in which the maintenance personnel determine, on-site, that the information brought along in the PDA and/or in paper form is not sufficient and further information must be obtained from the computer-supported, upkeep system. The required maintenance tasks can then not be performed immediately, and a new schedule must be arranged. Additionally, there is, in the case of the practice to this point in time, the danger that the most up-to-date information will not be obtained before every maintenance task to be performed, but, instead, the already present information will be used, as stored in the PDA or printed out in paper form. This can, however, already be outdated. After performing the upkeep work, relevant information, such as, for example, a service report, information regarding required replacement parts, etc. must be input into the computer or the data processing installation, where the computer-supported, upkeep system is implemented. For this, in turn, the same opportunities of access are available, which were already mentioned above in reference to the obtaining of the presumably required information. Also this subsequent inputting of data involves a considerable amount of time.

OBJECT AND SUMMARY OF THE INVENTION

Accordingly, an object of the present invention is to provide a method, by which maintenance personnel located on-site at the field device can exchange information with a computer-supported, upkeep system in faster and simpler manner.

The object is achieved by the method described and claimed.

According to the present invention, a method is provided for exchange, utilizing a mobile, manually portable device having an interface for a wireless Internet access, of upkeep-relevant information regarding a field device, with a computer-supported, upkeep system, which manages, in a database, upkeep-relevant information regarding the field device. The method includes the following steps:

Establishing a wireless Internet access by the mobile, manually portable device; and exchanging upkeep-relevant information regarding the field device between the computer-supported, upkeep system, which is connected to the Internet, and the mobile, manually portable device, via the Internet.

The term "upkeep" is meant herein to refer generally to maintenance, inspection, service and improvement. Maintenance includes, in such case, measures undertaken for delaying wear on a device. Inspection includes, especially, measures undertaken for determining and judging a current state, or condition, of a device. Service includes, especially, measures undertaken for bringing a device back into a function-capable state, such as, for instance, repair. Improvements include, especially, the increasing of the functional safety of a device, without changing the function executed by the device. Accordingly, also "upkeep-relevant information" includes, generally, information concerning the measures of maintenance, inspection, service and improvement.

The computer-supported upkeep system can include, especially, a CMMS and/or a PAM. These are, as a rule, implemented in a computer or a data processing installation, neither being located in the vicinity of the field devices of interest located at one or more plants. Additionally, the computer-supported, upkeep system can also comprise a manufacturer-specific, computer-supported upkeep system. Especially, it can be provided that not only one, but, instead, also a plurality of CMMS, PAM and manufacturer-specific, computer-supported, upkeep systems are implemented in a computer or data processing installation and utilized in parallel.

According to the present invention, a wireless Internet access is established by the mobile, manually portable device, so that upkeep-relevant information can be exchanged between the computer-supported upkeep system, which is connected, at least during the period of exchange, to the Internet, and the mobile, manually portable device. An advantage of the present invention is that the wireless Internet access makes such mobile, rather than stationary, so that a connection to the Internet can be established by the mobile, manually portable device independently of the current position of the device. Thereby, it is no longer necessary that the maintenance personnel obtain, in advance, comprehensive, presumably required information. Rather, the maintenance personnel can obtain the actually required information, via the mobile, manually portable device and the wireless Internet access, based on the situation found on-site at the field device of interest. Thereby, a fast exchange of information between the maintenance personnel (or the mobile, manually portable device) and the computer-supported upkeep system can occur, so that time is saved. Also, certain malfunction reports of a field device can be reacted to immediately, since, for example, the relevant information for treating the problem can be obtained via the Internet from the computer-supported upkeep system and the necessary operations can be directly carried out. Thereby, the time needed for upkeep is further reduced. Due to the opportunity for direct access of the maintenance personnel to the relevant information via the Internet, it is not necessary that the maintenance personnel proceed on the basis of high-level, device-specific, special knowledge of the individual field devices.

In an advantageous, further development of the invention, the exchange of upkeep-relevant information includes the retrieving and/or inputting of upkeep-relevant information regarding the field device from the, or into the, computer-supported upkeep system via the mobile, manually portable device.

Especially, the following information can be retrieved from the computer-supported upkeep system: Device data of the field device, handbooks on the field device, checklists, warranty information, upkeep intervals, service contracts, information concerning purchase date of the field device, information concerning the expected service life of the field device, replacement part information for the field device, information regarding availability of replacement parts, date of the last upkeep measures of the field device, information concerning malfunction reports of the field device and for handling problems, statistical information regarding frequency of various defects and/or concerning already performed upkeep work, information concerning available maintenance personnel, information on parametering, calibration and/or configuration of the field device, information regarding monitoring a condition, or state, of the field device, and/or work orders created by the computer-supported, upkeep system. Accordingly, the maintenance personnel can inform themselves comprehensively concerning the field device of interest and upkeep work already performed in the past. Further, there is, in part, the opportunity in the case of computer-supported upkeep systems that these check via the Internet at replacement part, storage locations of a manufacturer and/or at replacement part, storage locations of the plant operator, whether required replacement parts are available. This information can then, likewise, be reviewed by the maintenance personnel, so that the next steps can be directly planned. As was explained above with reference to CMMS, computer-supported upkeep systems are often constructed in such a manner that they create work orders for the maintenance personnel. Accordingly, the maintenance personnel can, in each case, review the work orders to be performed on-site at the field device of interest. Frequently, in the case of field devices, in the case of which a defect or error has arisen, malfunction reports are indicated on a display, so that the type of error is visible. The maintenance personnel can then access the computer-supported upkeep system to review information relevant to this malfunction report and the operations to be performed for treating the malfunction. For the case, in which, for example, an alarm has been issued in the case of a condition monitoring performed at a field device, or a parametering, calibration and/or configuration of the field device is to be done, the maintenance personnel can likewise access the computer-supported upkeep system to review the information required therefor.

Furthermore, according to a preferred form of embodiment, the following information can be input from the mobile, manually portable device into the computer-supported upkeep system: A service report, required replacement parts, an order regarding further upkeep tasks to be performed and/or an error report. This has the advantage that the information is directly available for third parties. Thereby, third parties can, for example, directly plan further upkeep tasks to be performed, order replacement parts, and/or inform themselves on the basis of service reports, which operations were performed by the maintenance personnel. By inputting an error report, the computer-supported upkeep system can be told that a malfunction has occurred at a certain field device. The maintenance personnel can then, in turn, be informed via the computer-supported upkeep system that an upkeep measure needs to be undertaken at the affected field device.

According to an advantageous further development, the mobile, manually portable device has a W-LAN (Wireless Local Area Network) interface, so that the mobile, manually portable device can establish a connection to the Internet via a W-LAN. Such a wireless accessing of the Internet via a local W-LAN is also known as a hotspot system. Alternatively or supplementally, it can be provided that the Internet access of the mobile, manually portable device is established via HSDPA (High Speed Downlink Packet Access), UMTS (Universal Mobile Telecommunications System), EDGE (Enhanced Data Rates for GSM Evolution) or GPRS (General Packet Radio Service). Preferably, the mobile, manually portable device includes an integrated web-browser.

According to an advantageous further development of the invention, the computer-supported upkeep system manages, in a database, upkeep-relevant information regarding a plurality of field devices of one or more plants. The managing of a plurality of field devices of one or more plants is a main area of application of such computer-supported upkeep systems and has the advantage that, by using only one software application, the upkeep-relevant information of a plurality of field devices can be effectively managed. In this way, also the management effort is reduced.

In order that the mobile, manually portable device can also process data and offer maintenance personnel more extensive functionalities, it has, in an advantageous further development, a data processing unit. Preferably, the mobile, manually portable device is a PDA (Personal Digital Assistant). A PDA has the advantage that it is small and easy to handle, includes a data processing unit, and provides the user with a high functionality. There is, in such case, the opportunity also to integrate other devices, such as, for example, a mobile phone, into the PDA. Fundamentally, also a notebook computer can be applied as a mobile, manually portable device. Preferably, however, the device is provided in pocket-format, such as, for example, in the size of a PDA or mobile phone.

In an advantageous further development of the invention, the exchange of upkeep-relevant information regarding the field devices occurs between the computer-supported upkeep system and the mobile, manually portable device by synchronizing the mobile, manually portable device and the computer-supported upkeep system with one another over the Internet. Understood under synchronizing is, in such case, the equalizing of data between the computer-supported upkeep system and the mobile, manually portable device, especially a PDA. This equalizing can occur automatically by an appropriate program.

For the case that a replacement part is required for the field device, an advantageous further development of the invention provides that an order for the replacement part is sent directly from the mobile, manually portable device via the wireless Internet access to a manufacturer or supplier of the replacement part or to a replacement part storage location (for example, of the plant operator). On occasion, also a confirmation regarding availability of the replacement part can be received via the mobile, manually portable device, so that the maintenance personnel can directly plan the next steps.

In an advantageous further development, the computer-supported upkeep system is implemented as software in a computer, and/or in a superordinated unit, connected with at least one field device, wherein the computer, or superordinated unit, is connectable with the Internet. In the case, in which the computer-supported upkeep system is installed on a computer, it is not required that this be connected with the particular field devices, whose upkeep information is managed. Rather, such a computer can be provided separately and spatially separated from the field devices.

If, however, the computer-supported upkeep system is implemented in a superordinated unit and if the relevant field device to be upkept is connected via a bus system with this superordinated unit, then such an arrangement offers the further advantage that upkeep-relevant information regarding the field device are exchangeable over the bus system between the field device and the computer-supported upkeep system. In this case, it is advantageous, when the field device is equipped with further upkeep-relevant information and functions, especially when there is stored in the field device a list of the replacement parts for the field device and their relevant ordering information and/or device-specific information regarding upkeep tasks to be performed. Then, the field device can send to the computer-supported upkeep system via the bus system a request for one or more replacement parts and/or a request regarding an upkeep task to be carried out. This sent information is then, for example, processed in the computer-supported upkeep system and corresponding work orders (authorization for ordering a replacement part and order for performing an upkeep task) are created for the maintenance personnel. These work orders can then, in turn, be accessed, via the Internet and the mobile, manually portable device, by the maintenance personnel. In this way, a fast execution of the necessary upkeep tasks is assured with low workforce effort.

BRIEF DESCRIPTION OF THE DRAWINGS

Further advantages and purpose-aiding features of the invention will be evident on the basis of the following description of examples of embodiments in reference to the appended drawing, the figures of which show as follows.

DETAILED DISCUSSION

Figure 1:
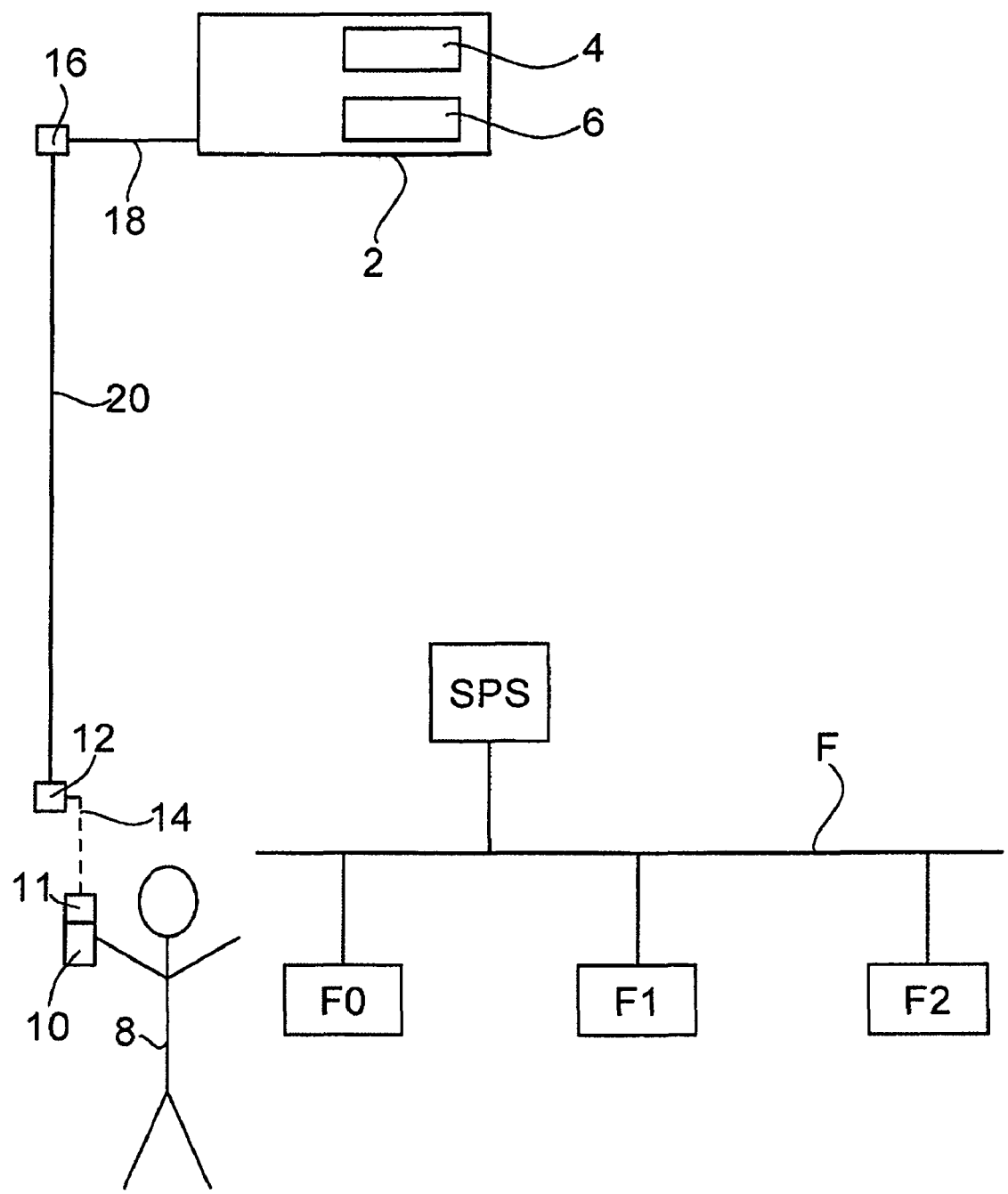
FIG. 1 a schematic drawing of a fieldbus network and a computer-supported upkeep system according to a first form of embodiment of the invention.

The schematic drawing in FIG. 1 shows a small fieldbus network, in the case of which three field devices F0, F1 and F2 and a control unit PLC are connected to a fieldbus F. The control unit PLC is a master, while the field devices F0, F1 and F2 are, in each case, slaves. Communication between the control unit PLC and the field devices F0, F1 and F2 is accomplished via the fieldbus F according to an appropriate fieldbus standard (for example, Profibus®, Foundation® Fieldbus, etc.).

Spatially separated from the fieldbus network is a computer 2, in which a computer-supported upkeep system is implemented. In the present case, the computer-supported upkeep system is composed of a CMMS 4 and a PAM 6. The CMMS 4 and the PAM 6 execute, in such case, the above-explained functions and manage the upkeep-relevant information of the field devices F0, F1 and F2 in a database.

In the following, an example will be explained, in the case of which a defect has arisen in the field device F0. A maintenance person 8 is sent to the field device F0, in order to repair such. In such case, the maintenance person 8 brings along a PDA 10. Often, field devices are equipped with a GPS-receiver (not shown), so that they determine their position exactly and can be located simply by a PDA 10, which likewise is equipped with a GPS-receiver (not shown). On the PDA 10, the maintenance person 8 can, already in advance, store upkeep-relevant information regarding the field device F0, so that such is available on-site.

If further information is required for performing the repair, then the maintenance person 8 can establish contact via the Internet with the computer-supported upkeep system in the computer 2. For this purpose, in the present example of an embodiment, a hotspot system is installed in the area of the plant, where the field devices F0, F1 and F2 are located. The PDA has a W-LAN interface 11, via which the PDA 10 can obtain access to the local W-LAN, which is provided by the hotspot system. Additionally, the hotspot system has an interface 12 between the W-LAN and the Internet. In FIG. 1, the connection between PDA 10 and the interface 12 via the W-LAN is indicated by dashed line 14. Accordingly, via the hotspot system, a wireless Internet access is established from the PDA 10. Also computer 2, in which the CMMS 4 and the PAM 10 are implemented, is connected to the Internet via a stationary modem 16, with which the computer 2 is connected via an appropriate line 18. The Internet connection between the interface 12 and the modem 16 is indicated in FIG. 1 by the continuous line 20.

For requesting further information, the maintenance person 8 sends from the PDA 10 via the Internet a corresponding inquiry, in which, as a rule, at the same time, the identity of the maintenance person 8, the basis for the inquiry, the operation to be performed, the location and an identifier, such as an identifying number, for identifying the field device F0 are input. The entries, which are to be transmitted in the case of such an inquiry, can vary, depending on the particular circumstances and on the computer-supported upkeep system being used. The requested information is then sent from the computer 2 via the Internet directly to the PDA 10.

After performing the repair work, the maintenance person inputs a service report into the PDA 10. This service report can, in such case, include the location and an identifier for the repaired field device F0, the operations performed, the context and extent of the operations, the documentation used for solving the problem, a problem diagnosis, a description of the solution, input of the replacement parts applied and/or a required contacting of a specialist, etc.; the particular information entered can vary, depending on the circumstances and on the computer-supported upkeep system being used. The service report can, upon completion, be automatically synchronized between the PDA 10 and the computer 2, especially the CMMS 4 and the PAM 6, via the Internet.

Should a replacement part be needed for performing the repair, the maintenance person 8 can send an order via the PDA 10 and the Internet directly to a manufacturer or a supplier of the replacement part or to a replacement part, storage location of the plant operator. On occasion, the maintenance person 8 can receive, via the Internet and the PDA 10, a corresponding confirmation, that the ordered replacement part is available.

Figure 2:
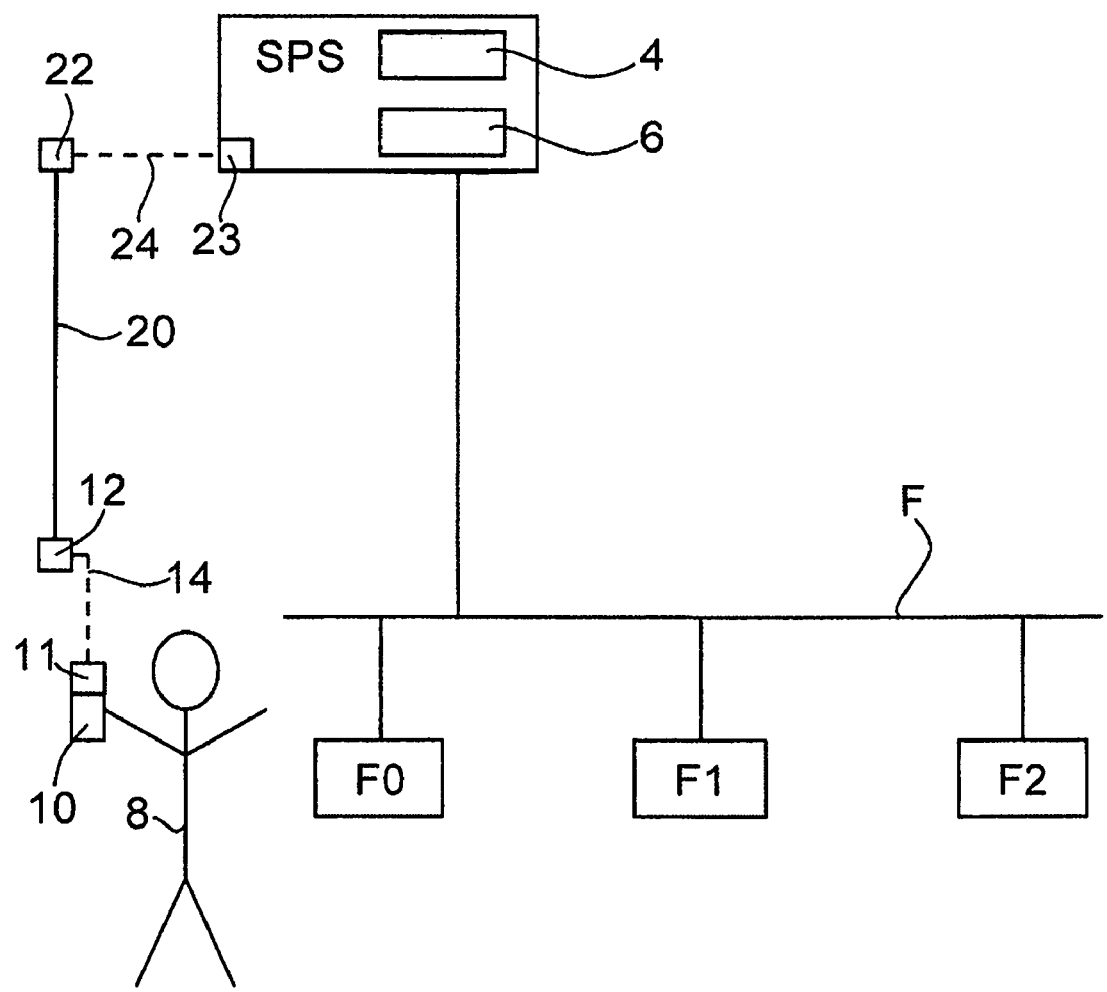
FIG. 2 a schematic drawing of a fieldbus network and a computer-supported upkeep system according to a second form of embodiment of the invention.

A second form of embodiment of the present invention will now be explained with reference to FIG. 2. In such case, equal parts are labeled with equal reference characters. In the following, only differences, as compared with the first form of embodiment, will be discussed.

In the second form of embodiment, the CMMS 4 and the PAM 6 are integrated into the control unit PLC, which is connected to the fieldbus F. In this way, there is the opportunity for exchanging upkeep-relevant information between the individual field devices F0, F1 and F2 and the CMMS 4 and/or the PAM 6 directly via the fieldbus F.

The control unit PLC includes, additionally, a W-LAN interface 23, so that an Internet access can be established by the control unit PLC via a hotspot system, such as has been explained above in reference to the first form of embodiment for the Internet access of the PDA 10. The interface between the W-LAN and the Internet is indicated in FIG. 2 with the reference character 22. The W-LAN connection between the control unit PLC and the interface 22 is shown schematically in FIG. 2 by a dashed line 24. Accordingly, a maintenance person located at one of the field devices F0, F1 and F2 and equipped with a PDA 10, can exchange upkeep-relevant information, via the Internet, with the control unit PLC.

Since the field devices F0, F1 and F2 can each exchange upkeep-relevant information via the fieldbus F with the control unit PLC and thus with the CMMS 4 and the PAM 6, it is provided in this form of embodiment, that the individual field devices F0, F1 and F2 are equipped with additional, upkeep-relevant information and functions. Especially, a field device F0, F1 or F2 can initiate an upkeep measure, by sending, for example upon the occurrence of a certain error or upon the exceeding of a certain limit value, an appropriate order to the control unit PLC. This order is then processed in the CMMS 4 and/or in the PAM 6, and a corresponding work order is created for the maintenance personnel. The maintenance person 8 can, in turn, review the order and, on occasion, additional information, via the Internet and the PDA 10, from the CMMS 4 and/or the PAM 6.

Additionally, the field devices F0, F1 and F2 can be embodied in such a manner that they manage lists of replacement parts for themselves and corresponding relevant ordering information, especially ordering numbers. If, in a field device F0, F1 or F2, an announcement is produced, that a certain part needs to be replaced, or if this announcement is input to the field device F0, F1 or F2 by a maintenance person 8 during an inspection, then the field device field device F0, F1 or F2 can directly send a corresponding order for the replacement part via the fieldbus F to the control unit PLC. The CMMS 4 can then check, whether the replacement part is available in a replacement part storage location of the plant operator or at a manufacturer or supplier. Maintenance personnel can, then, in turn, access information and work orders provided by the control unit PLC and especially by the CMMS 4 and/or the PAM 6, and, in the present case, send an order for replacement parts.

Supplementally, device-specific information can be stored in the field devices F0, F1 and F2 regarding upkeep work that needs to be done, in order to support the activities of the maintenance personnel. In this case, the individual field devices F0, F1 and F2 can, in turn, as required, e.g. upon the expiration of an upkeep interval, send a report to the control unit PLC, and especially to the CMMS 4 and the PAM 6, via the fieldbus F, to the effect that a certain upkeep measure needs to be performed. As explained above, this report is then, in turn, processed in the CMMS 4 and/or the PAM 6, and a maintenance person can retrieve the relevant information, or the work order, from the CMMS 4 and/or the PAM 6 via the PDA 10.

The present invention is not limited to the examples of embodiments shown in the figures and described above. The kind of Internet access of the computer or the control unit, on which the computer-supported upkeep system is implemented, is insignificant for performing the present invention. The Internet access can be, for example, a stationary Internet access, such as provided, for example, by a cable modem, or it can also be embodied in the form of a mobile, i.e. wireless, Internet access. Additionally, it is not absolutely necessary, that the individual field devices be connected to the superordinated unit, or control unit, via a bus system. For example, also a parallel wiring or an analog signal transmission between the field devices and the superordinated unit are available options.

The invention claimed is:

1. A method for exchange, utilizing a mobile, manually portable device, which has an interface for a wireless Internet access, of upkeep-relevant information regarding a field device with a computer-supported upkeep system, which manages upkeep-relevant information regarding the field device in a database the method comprising the steps of:
    establishing a wireless Internet access from the mobile, manually portable device; and
    exchanging, via the Internet, between the computer-supported upkeep system, which is connected to the Internet, and the mobile, manually portable device, upkeep-relevant information regarding the field device wherein:
    the step of exchanging of upkeep-relevant information regarding the field device includes retrieving upkeep-relevant information regarding the field device from the computer-supported upkeep system by the mobile, manually portable device, especially the retrieving of device data of the field device, handbooks for the field device, checklists, warranty information, upkeep intervals, service contracts, information concerning purchase date of the field device, information concerning expected service life of the field device, replacement part information for the field device, information regarding availability of replacement parts, date of last upkeep measure for the field device, information on malfunction reports of the field device and on problem handling, statistical information regarding frequency of various defects and/or of already performed upkeep work, information concerning available maintenance personnel, information for parametering, calibrating and/or configuring the field device, information regarding condition monitoring of the field device, and/or work orders created by the computer-supported upkeep system.

2. The method as claimed in claim 1, wherein:
the mobile, manually portable device includes a W-LAN (Wireless Local Area Network) interface, so that a W-LAN access of the mobile, manually portable device to the Internet can be established; and/or
that the Internet access of the mobile, manually portable device can be established via HSDPA, UMTS, EDGE or GPRS, wherein:
the mobile, manually portable device preferably includes an integrated web browser.

3. The method as claimed in claim 1, wherein:
the step of exchanging upkeep-relevant information regarding the field device includes inputting upkeep-relevant information regarding the field device from the mobile, manually portable device into the computer-supported upkeep system, especially inputting a service report, required replacement parts, an order regarding further upkeep work to be performed, and/or a malfunction report.

4. The method as claimed in claim 1, wherein:
the computer-supported upkeep system manages, in a database, upkeep-relevant information regarding a plurality of field devices of one or more plants.

5. The method as claimed in claim 1, wherein:
the mobile, manually portable device includes a data processing unit, especially that the mobile, manually portable device is a PDA (Personal Digital Assistant).

6. The method as claimed in claim 1, wherein:
the exchange of upkeep-relevant information regarding the field device between the computer-supported upkeep system and the mobile, manually portable device includes synchronizing the mobile, manually portable device and the computer-supported upkeep system with one another via the Internet.

7. The method as claimed in claim 1, wherein:
the computer-supported, upkeep system comprises a "CMMS" (Computerized Maintenance Management System) and/or a "PAM" (Plant Asset Management).

8. The method as claimed in claim 1, wherein:
the computer-supported upkeep system is implemented as software in a computer and/or in a superordinated unit connected with at least one field device, and either the computer or the superordinated unit, or both the computer and the superordinated unit, is/are connectable with the Internet.

9. The method as claimed in claim 1, wherein:
the field device isconnected via a bus system with a superordinated unit;
the computer-supported upkeep system is implemented in the superordinated unit, so that upkeep-relevant information regarding the field device is exchangeable via the bus system between the field device and the computer-supported upkeep system, especially that the field device sends to the computer-supported upkeep system via the bus system a request for one or more replacement parts, and/or a request regarding upkeep work to be performed.

10. The method as claimed in claim 9, wherein:
stored in the field device are/is a list of replacement parts for the field device and their relevant ordering information, and/or device-specific information regarding upkeep work to be performed.

11. A method for exchange, utilizing a mobile, manually portable device, which has an interface for a wireless Internet access, of upkeep-relevant information regarding a field device with a computer-supported upkeep system, which manages upkeep-relevant information regarding the field device in a database the method comprising the steps of:
establishing a wireless Internet access from the mobile, manually portable device; and
exchanging, via the Internet, between the computer-supported upkeep system, which is connected to the Internet, and the mobile, manually portable device, upkeep-relevant information regarding the field device, wherein:
in a case in which a replacement part is required for the field device, the following step is performed:
sending an order for the replacement part from the mobile, manually portable device via wireless Internet access to a manufacturer or a supplier of the replacement part, or to a replacement part storage location.

* * * * *